(12) United States Patent
Sugiyama et al.

(10) Patent No.: US 10,451,465 B2
(45) Date of Patent: Oct. 22, 2019

(54) GAS METER

(71) Applicant: Panasonic Intellectual Property Management Co., Ltd., Osaka (JP)

(72) Inventors: Masaki Sugiyama, Kyoto (JP); Hiroaki Ishimoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/064,299

(22) PCT Filed: Nov. 16, 2016

(86) PCT No.: PCT/JP2016/004899
§ 371 (c)(1),
(2) Date: Jun. 20, 2018

(87) PCT Pub. No.: WO2017/122239
PCT Pub. Date: Jul. 20, 2017

(65) Prior Publication Data
US 2019/0003868 A1    Jan. 3, 2019

(30) Foreign Application Priority Data
Jan. 12, 2016    (JP) .................................. 2016-003581

(51) Int. Cl.
*G01F 1/66* (2006.01)
*G01F 15/04* (2006.01)
(Continued)

(52) U.S. Cl.
CPC .............. *G01F 15/04* (2013.01); *F15D 1/02* (2013.01); *G01F 1/662* (2013.01); *G01F 15/00* (2013.01); *G01F 15/14* (2013.01); *G01F 15/185* (2013.01)

(58) Field of Classification Search
CPC .................................. G01F 1/66; G01F 15/04
See application file for complete search history.

(56) References Cited

U.S. PATENT DOCUMENTS 5,243,863 A    9/1993    Gill
8,689,638 B2 *    4/2014    Shen ...................... G01F 1/662
73/861.25
(Continued)

FOREIGN PATENT DOCUMENTS

JP    2002-243515    8/2002
JP    2002-267513    9/2002
(Continued)

OTHER PUBLICATIONS

International Search Report of PCT application No. PCT/JP2016/004899 dated Jan. 31, 2017.
(Continued)

*Primary Examiner* — Jewel V Dowtin
(74) *Attorney, Agent, or Firm* — Wenderoth, Lind & Ponack, L.L.P.

(57) ABSTRACT

A gas meter includes meter body that has internal space, meter inlet into which a fluid flows, meter outlet from which the fluid flows out, and shielding plate that is located with a predetermined distance from an opening portion of meter inlet. In addition, the gas meter includes flow rate measurer that measures a flow rate of the fluid, and connection member that connects outlet of flow rate measurer and meter outlet to each other. Furthermore, meter inlet, shielding plate, flow rate measurer, connection member, and meter outlet are linearly located in this order.

8 Claims, 6 Drawing Sheets

(51) Int. Cl.
  *F15D 1/02*   (2006.01)
  *G01F 15/00*  (2006.01)
  *G01F 15/14*    (2006.01)
  *G01F 15/18*    (2006.01)

(56) References Cited

U.S. PATENT DOCUMENTS

| | | | |
|---|---|---|---|
| 9,016,137 B2* | 4/2015 | Muench | G01F 1/667 |
| | | | 73/861.18 |
| 9,404,244 B1* | 8/2016 | Gass | E03C 1/104 |
| 2011/0238333 A1 | 9/2011 | Miyata et al. | |
| 2013/0167655 A1 | 7/2013 | Fujii et al. | |
| 2014/0230540 A1* | 8/2014 | Golzhauser | G01F 15/14 |
| | | | 73/273 |
| 2014/0230541 A1* | 8/2014 | Herold | G01F 15/14 |
| | | | 73/273 |
| 2015/0253166 A1 | 9/2015 | Yasuda et al. | |
| 2017/0115145 A1* | 4/2017 | van Dijk | A01J 5/01 |
| 2019/0226892 A1* | 7/2019 | Kuhlemann | G01F 1/662 |

FOREIGN PATENT DOCUMENTS

| | | |
|---|---|---|
| JP | 2010-164558 | 7/2010 |
| JP | 2012-103087 | 5/2012 |

OTHER PUBLICATIONS

Extended European Search Report dated Jan. 7, 2019 in corresponding European Patent Application No. 16884843.0.

\* cited by examiner

GAS METER

CROSS-REFERENCE TO RELATED APPLICATIONS

This application is a U.S. national stage application of the PCT International Application No. PCT/JP2016/004899 filed on Nov. 16, 2016, which claims the benefit of foreign priority of Japanese patent application No. 2016-003581 filed on Jan. 12, 2016, the contents all of which are incorporated herein by reference.

TECHNICAL FIELD

The present invention relates to a gas meter using a measurement unit for measuring a gas flow rate, and particularly relates to a gas meter suitable for high flow rate measurement.

BACKGROUND ART

In the related art, this type of gas meter illustrated in FIG. 9 is known. In FIG. 9, gas meter 1 is configured to include meter inlet 2, flow rate measurer 3, meter outlet 4, and connection member 5 which connects flow rate measurer 3 and meter outlet 4 to each other (for example, refer to PTL 1).

In this case, gas indicated by each arrow flows from meter inlet 2 into the meter outlet 4 by way of measurement flow path 6 of flow rate measurer 3 and flow path 7 configured to be located inside connection member 5.

According to this example in the related art, flow rate measurer 3 is configured to use a propagation time of ultrasonic waves. However, various measurement methods such as a thermal method and a fluidic method can be used.

CITATION LIST

Patent Literature

PTL 1: Japanese Patent Unexamined Publication No. 2012-103087

SUMMARY OF THE INVENTION

However, according to the gas meter in the related art disclosed in PTL 1, the gas flowing from meter inlet 2 directly enters measurement flow path 6. Accordingly, if a flowing state of the gas is not equal, the flow rate is distributed in disorder in flow rate measurer 3, thereby causing a problem in that accurate measurement cannot be performed.

The present invention aims to provide a gas meter disposed in an intermediate portion of a gas pipe. The gas meter can perform accurate measurement by equalizing a flow of gas which is a fluid flowing into a measurement flow path.

According to the present invention, there is provided a gas meter including a meter body that has an internal space, a meter inlet into which a fluid flows, a meter outlet from which the fluid flows out and a shielding plate that is located with a predetermined distance from an opening portion of the meter inlet. In addition, the gas meter includes a flow rate measurer that measures a flow rate of the fluid, and a connection member that connects an outlet of the flow rate measurer and the meter outlet to each other. Furthermore, the meter inlet, the shielding plate, the flow rate measurer, the connection member, and the meter outlet are linearly located in this order.

In this manner, the gas flowing from the meter inlet is spread to the internal space of the meter body by the shielding plate. Thereafter, the gas flows into the measurement flow path. Accordingly, flow velocity of the gas is stably distributed, thereby improving accuracy in measuring the flow rate in the flow rate measurer.

DESCRIPTION OF EMBODIMENT

Figure 1A:
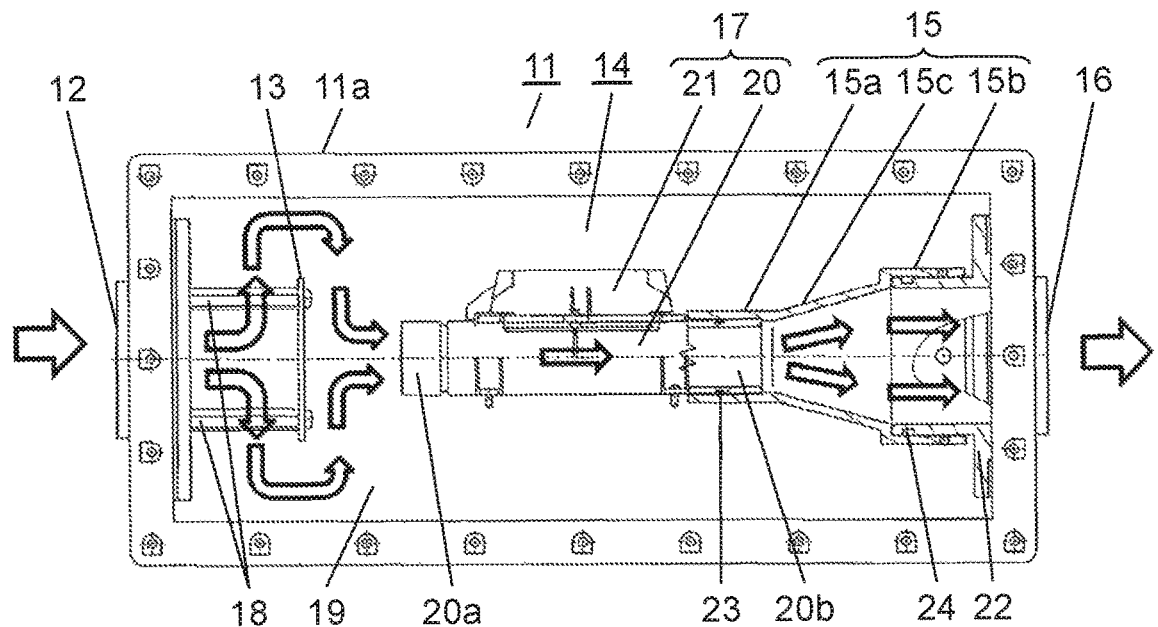
FIG. 1A is a schematic sectional view of a gas meter according to an exemplary embodiment of the present invention.

Hereinafter, a gas meter according to an exemplary embodiment of the present invention will be described with reference to the drawings. The same reference numerals will be given to the same configuration elements. The previously described configuration elements will be omitted in the description. The present invention is not limited to the exemplary embodiment described below.

Exemplary Embodiment

Figure 1B:
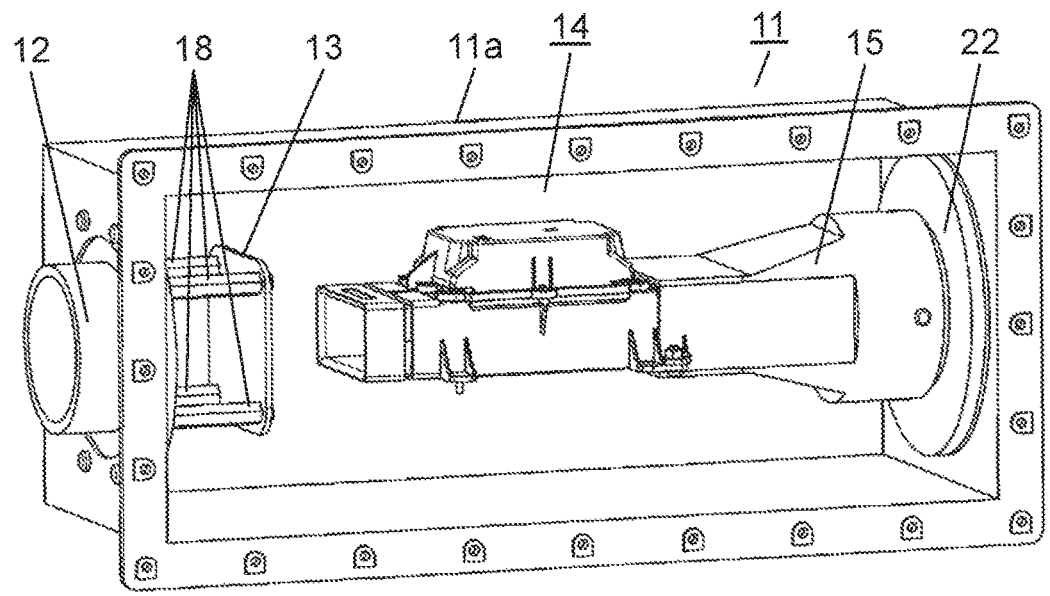
FIG. 1B is a schematic perspective view of the gas meter according to the exemplary embodiment of the present invention.

FIG. 1A is a schematic sectional view of a gas meter according to an exemplary embodiment of the present invention. FIG. 1B is a schematic perspective view of the gas meter according to the exemplary embodiment of the present invention.

As illustrated, gas meter 11 has meter body 11a that has internal space 19, meter inlet 12, shielding plate 13, flow rate measurer 14, connection member 15, and meter outlet 16. Meter inlet 12, shielding plate 13, flow rate measurer 14, connection member 15, and meter outlet 16 are linearly located in this order.

Gas meter 11 is connected to meter inlet 12 and meter outlet 16 in an intermediate portion of a pipe (not illustrated) for delivering gas which is a fluid, and is installed so as to measure a flow rate of the gas flowing through the pipe. In addition, flow rate measurer 14 having a function to measure the flow rate of the gas is configured to include one or more flow rate measurement units 17. In gas meter 11 illustrated in FIG. 1, flow rate measurer 14 is configured to include one flow rate measurement unit 17. Therefore, in FIG. 1, flow rate measurer 14 and flow rate measurement unit 17 are the same as each other.

Flow rate measurement unit 17 is configured to include measurement flow path 20 through which the gas serving as a measurement target flows, and arithmetic unit 21 in which a sensor for measuring the flow rate and the arithmetic circuit are incorporated. Details will be described later.

As illustrated in FIG. 1B, shielding plate 13 is formed in a quadrangular flat plate shape, and four corners thereof are fixed by rod-like fixing member 18 located on an outer periphery of an opening (not illustrated) of meter inlet 12. Each illustrated arrow indicates a flow of the gas. After the gas which is the fluid flows from meter inlet 12, the gas is spread in all directions by shielding plate 13, and is spread to internal space 19 of meter body 11a. Thereafter, the gas flows into measurement flow path 20 from inlet 20a of flow rate measurement unit 17.

Connection member 15 has connector 15a on one side, and outlet 20b of measurement flow path 20 is inserted into and is airtightly connected to connector 15a. Connection member 15 has connector 15b on the other side, and connector 15b is airtightly connected to flange 22 disposed in meter outlet 16. Sealing member 23 for ensuring airtightness is used for connector 15a, and sealing member 24 for ensuring airtightness is used for connector 15b. In addition, connection member 15 includes expanding portion 15c which connects connector 15a and connector 15b having a cross-sectional shape different from that of connector 15a. The gas which is the fluid smoothly flows from outlet 20b of measurement flow path 20 to meter outlet 16 having a large diameter.

Figure 2A:
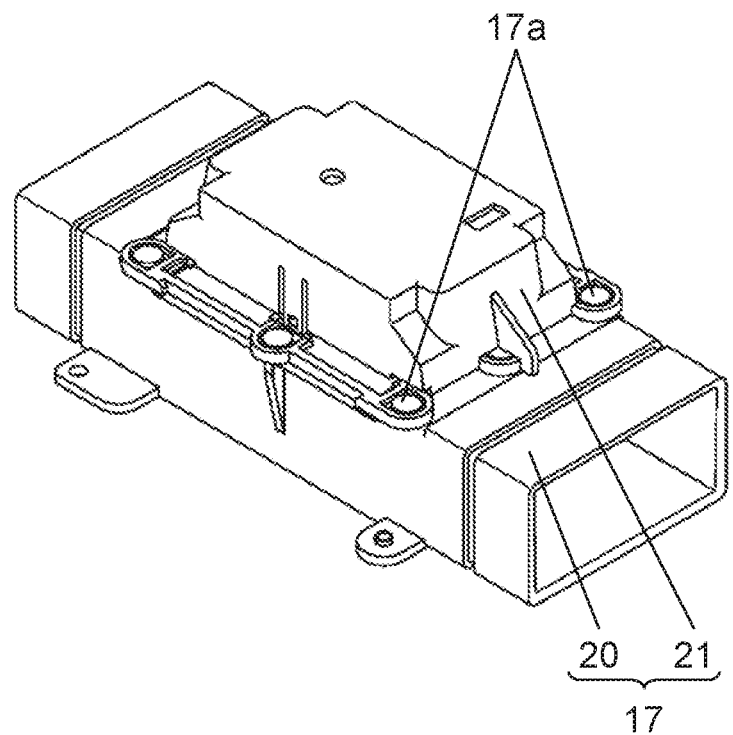
FIG. 2A is a perspective view when viewed from above a flow rate measurement unit of the gas meter according to the exemplary embodiment of the present invention.
Figure 2B:
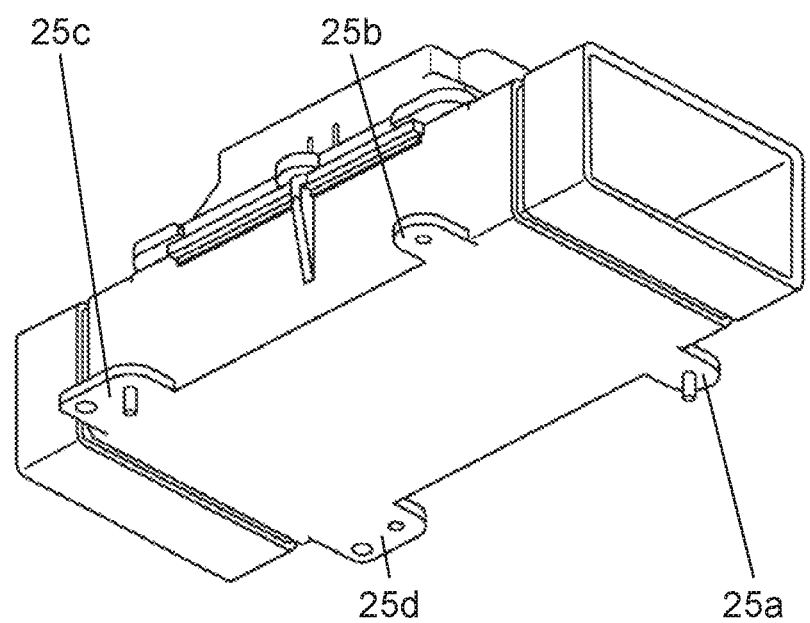
FIG. 2B is a perspective view when viewed from below the flow rate measurement unit of the gas meter according to the exemplary embodiment of the present invention.

FIG. 2A is a perspective view of the flow rate measurement unit 17. As illustrated, measurement flow path 20 and arithmetic unit 21 are integrally fastened to each other using fastening portion 17a. In addition, as illustrated in FIG. 2B, measurement flow path 20 includes engagement portions 25a to 25d on all sides of a surface opposite to arithmetic unit 21, and can be locked to connection member 15. In a configuration using two flow rate measurement units 17 (to be described later), both of these are locked to each other.

Figure 3:
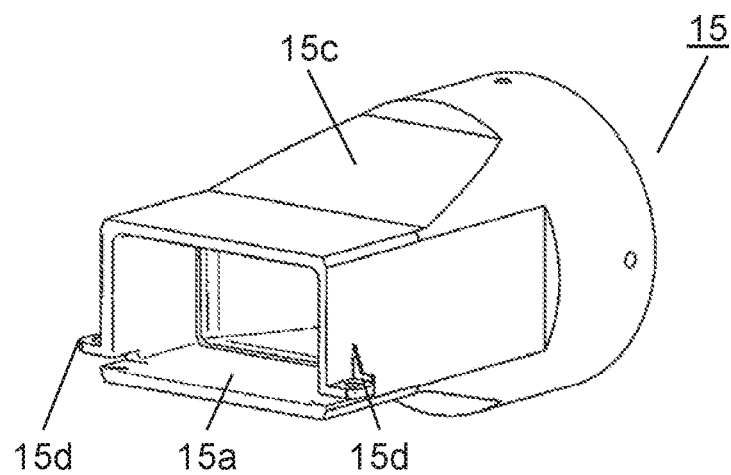
FIG. 3 is a perspective view of a connection member of the gas meter according to the exemplary embodiment of the present invention.
Figure 4:
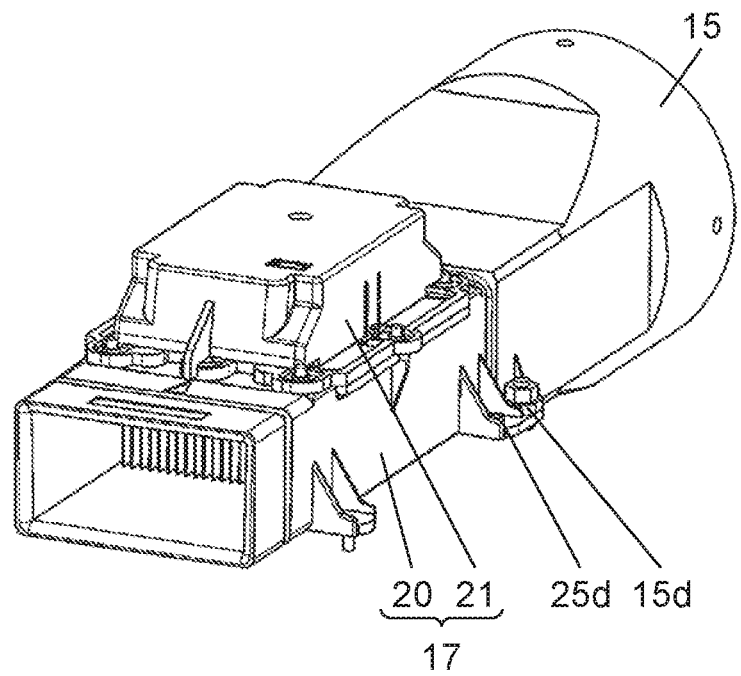
FIG. 4 is a perspective view illustrating a coupling state of the flow rate measurement unit and the connection member of the gas meter according to the exemplary embodiment of the present invention.

FIG. 3 is a perspective view of connection member 15, and FIG. 4 is a perspective view in which connection member 15 and flow rate measurement unit 17 are connected to each other. As illustrated, connection member 15 and flow rate measurement unit 17 are fastened to each other with a screw by using engagement portion 15d of connection member 15 and engagement portion 25d of flow rate measurement unit 17.

Here, a method of measuring the flow rate of the gas in the flow rate measurement unit 17 will be described.

Figure 5:
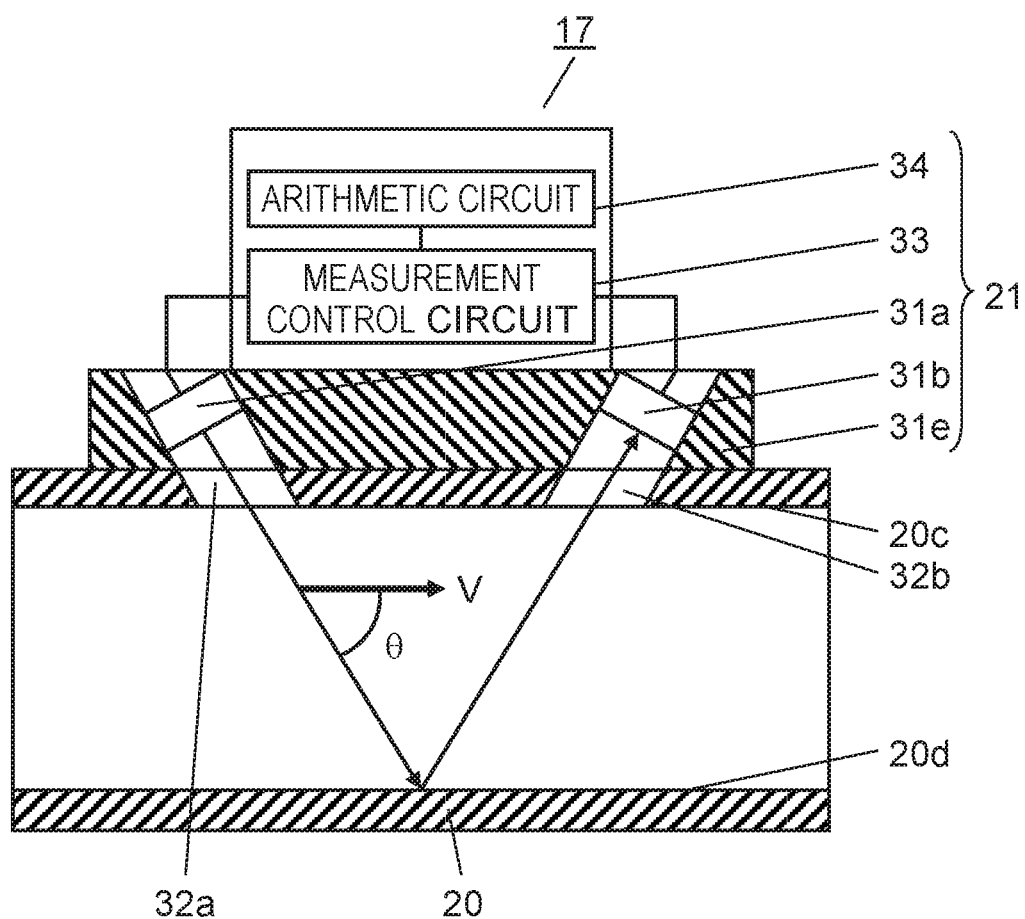
FIG. 5 is a schematic block diagram of the flow rate measurement unit of the gas meter according to the exemplary embodiment of the present invention.

FIG. 5 illustrates a block diagram of flow rate measurement unit 17. Flow rate measurement unit 17 is configured to measure the flow rate by using ultrasonic waves. As illustrated, flow rate measurement unit 17 transmits and receives the ultrasonic waves by using first ultrasonic transducer 31a located on an upstream side and second ultrasonic transducer 31b located on a downstream side. In addition, flow rate measurement unit 17 includes measurement control circuit 33 that switches transmission and reception of ultrasonic transducers 31a and 31b, outputs a transmission signal or receives a reception signal, and measures a propagation time, and arithmetic circuit 34 that calculates flow velocity or the flow rate, based on the propagation time. These are attached to sensor block 31e.

On the other hand, upper surface 20c of measurement flow path 20 has first ultrasonic wave transmission window 32a and second ultrasonic wave transmission window 32b.

First ultrasonic wave transmission window 32a and second ultrasonic wave transmission window 32b are formed of a material through which the ultrasonic waves can be transmitted, but may be an opening portion through which the ultrasonic waves can be transmitted. In a case where respective ultrasonic wave transmission windows 32a and 32b are formed of the material through which the ultrasonic waves can be transmitted, a difference between acoustic impedance of an incident surface and acoustic impedance of a transmitting surface may be smaller than a predetermined value. Portions other than first ultrasonic wave transmission window 32a and second ultrasonic wave transmission window 32b on upper surface 20c of measurement flow path 20 may be covered with a panel, for example. Lower surface 20d of measurement flow path 20 is configured to act as a reflecting surface of the ultrasonic waves.

Hereinafter, a principle of the flow rate measurement using the ultrasonic waves will be described with reference to FIG. 5.

The flow velocity of the fluid flowing through measurement flow path 20 is set to V, sound velocity in the fluid is set to C, and an angle formed between a flowing direction of the fluid and a propagation direction of the ultrasonic waves until the ultrasonic waves are reflected on lower surface 20d is set to θ. In addition, an effective length of a propagation route of the ultrasonic waves propagating between first ultrasonic transducer 31a and second ultrasonic transducer 31b is set to L.

Measurement control circuit 33 controls transmission of the ultrasonic waves from first ultrasonic transducer 31a and reception of the ultrasonic waves in second ultrasonic transducer 31b. Propagation time t1 until the ultrasonic waves transmitted from first ultrasonic transducer 31a reach second ultrasonic transducer 31b is expressed by the following equation.

$$t1 = L/(C+V \cos \theta) \quad (1)$$

In addition, measurement control circuit 33 controls transmission of the ultrasonic waves from second ultrasonic transducer 31b and reception of the ultrasonic waves in first ultrasonic transducer 31a. Propagation time t2 until the ultrasonic waves transmitted from second ultrasonic transducer 31b reach first ultrasonic transducer 31a is expressed by the following equation.

$$t2 = L/(C-V \cos \theta) \quad (2)$$

If sound velocity C of the fluid is eliminated from Expression (1) and Expression (2), the following expression is obtained.

$$V = (L/(2 \cos \theta)) \times ((1/t1)-(1/t2)) \quad (3)$$

As understood from Expression (3), if L and θ are known, measurement control circuit 33 measures propagation times t1 and t2 so as to obtain flow velocity V. Arithmetic circuit 34 calculates flow velocity V.

Furthermore, as illustrated in the following expression, arithmetic circuit 34 calculates flow rate Q by multiplying flow velocity V by cross-sectional area S of the measurement flow path and preliminarily tested coefficient K.

$$Q = K \times V \times S \tag{4}$$

In the above-described example, the flow rate measurement principle of a so-called V-path method has been described. However, this is merely an example. A so-called Z-path method or a measurement principle called I-path method may be used.

In addition, it is not mandatory that the flow rate measurement method is a method of using the ultrasonic waves. A known measurement instrument can be used as long as the measurement flow path is configured to linearly measure the flow rate from the meter inlet toward the meter outlet. For example, as the known measurement instrument, a thermal flow sensor may be used which measures the flow rate by using heat transfer caused by the flowing. Since these methods are known, description thereof will be omitted.

According to the above-described configuration, flow rate measurement unit 17 can measure the flow rate of the gas which is the fluid flowing through measurement flow path 20.

Flow rate measurement unit 17 of gas meter 11 according to the present exemplary embodiment can measure the flow rate as much as 10 cubic meters or more per hour, for example. More preferably, flow rate measurement unit 17 can measure the flow rate as much as 15 cubic meters to 30 cubic meters per hour. A flow rate measurement unit for household purposes measures the flow rate at most as much as approximately 6 cubic meters per hour. Accordingly, flow rate measurement unit 17 according to the present exemplary embodiment can measure a relatively high flow rate in facilities used for business purposes. However, flow rate measurement unit 17 of gas meter 11 according to the present exemplary embodiment may be used for the household purposes.

Furthermore, a plurality of flow rate measurement units 17 may be provided so that the higher flow rate can be measured. Therefore, a specific configuration in a case of using two flow rate measurement units 17 will be described below.

Figure 6:
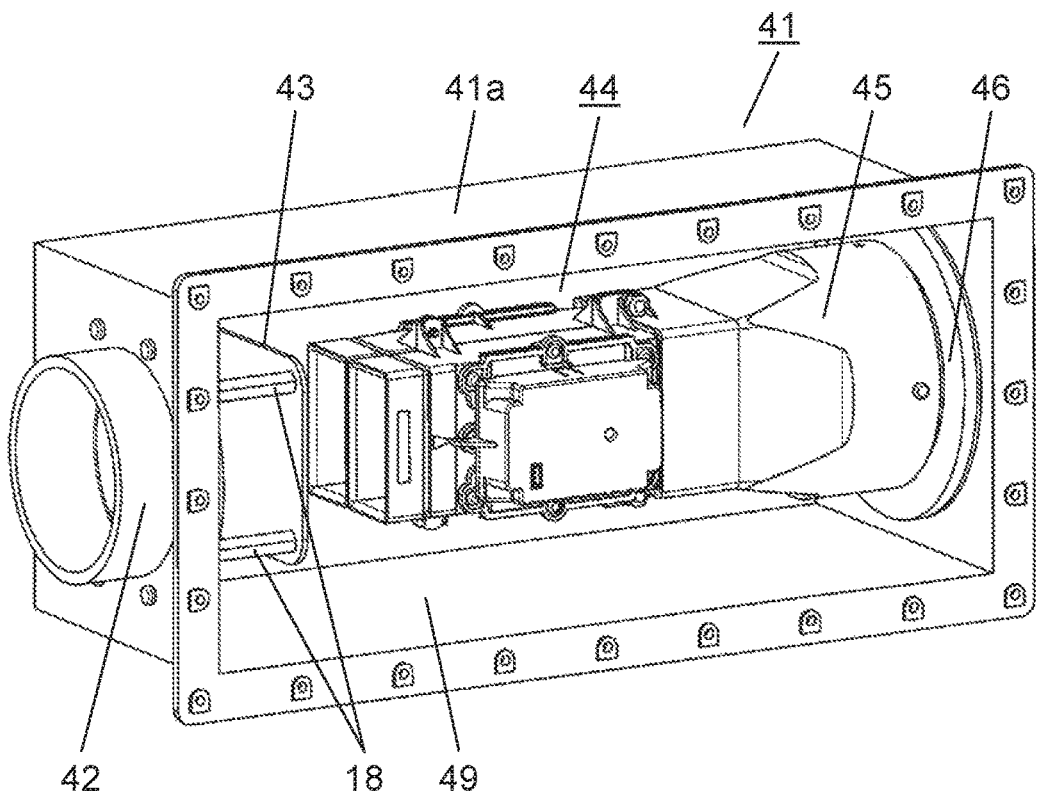
FIG. 6 is a schematic perspective view of the gas meter in a case of using two flow rate measurement units according to the exemplary embodiment of the present invention.

FIG. 6 is a schematic perspective view of gas meter 41 in a case where gas meter 41 is configured to include two flow rate measurement units 17. Similar to a case of using one flow rate measurement unit 17, gas meter 41 has meter body 41a that has internal space 49, meter inlet 42, shielding plate 43, flow rate measurer 44, connection member 45, and meter outlet 46. Furthermore, meter inlet 42, shielding plate 43, flow rate measurer 44, connection member 45, and meter outlet 46 are linearly located in this order.

Figure 7:
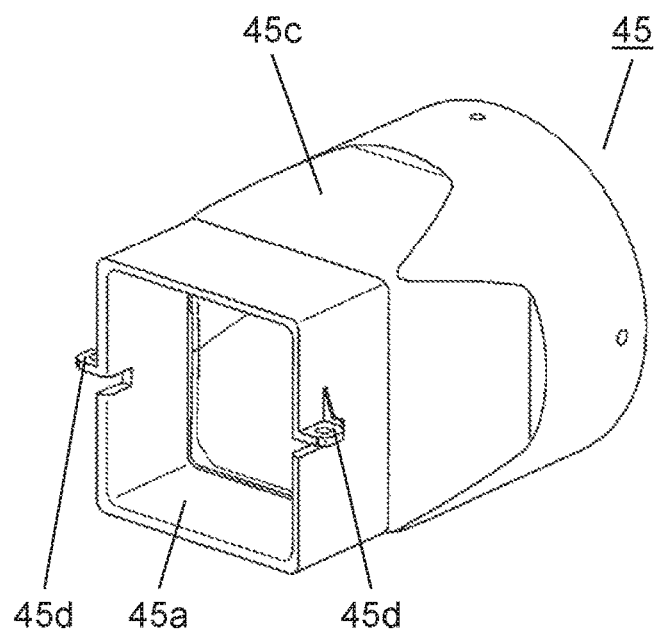
FIG. 7 is a perspective view of the connection member of the gas meter in a case of using the two flow rate measurement units according to the exemplary embodiment of the present invention.
Figure 8:
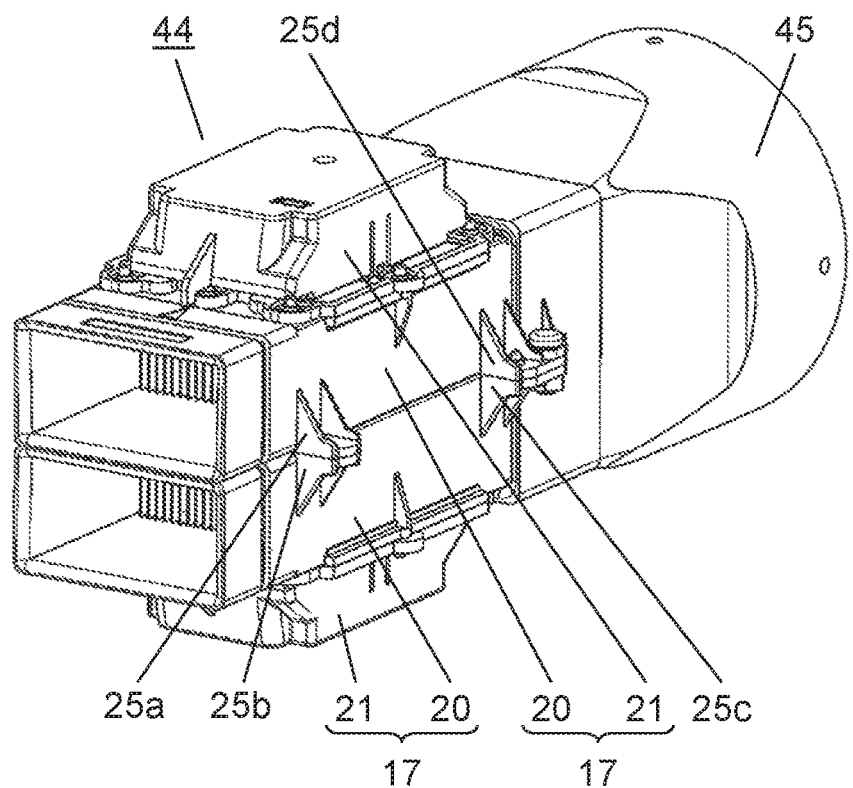
FIG. 8 is a perspective view illustrating a coupling state of the flow rate measurement unit and the connection member of the gas meter in a case of using the two flow rate measurement units according to the exemplary embodiment of the present invention.
Figure 9:
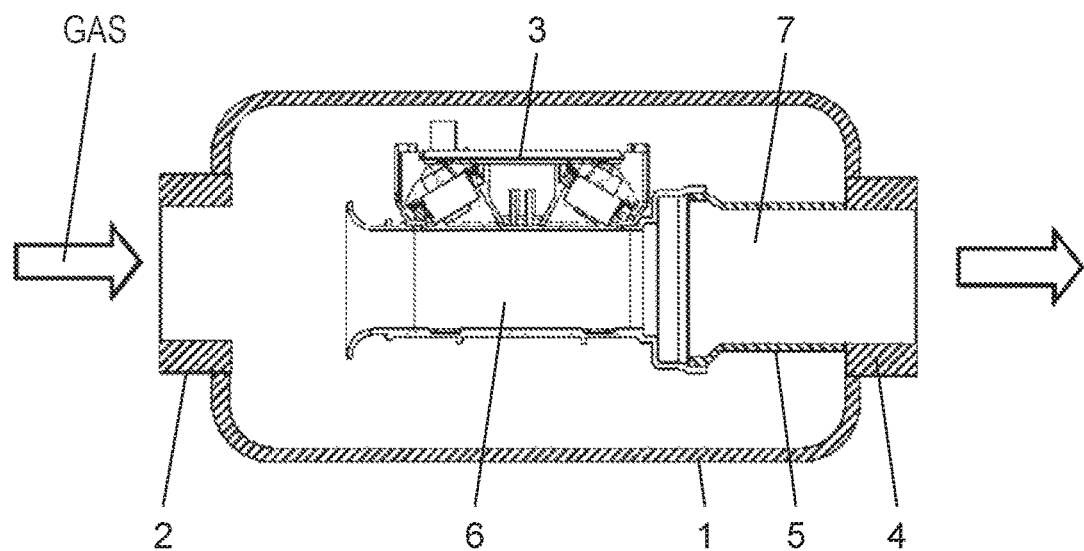
FIG. 9 is a sectional view schematically illustrating a gas meter in the related art.

FIG. 7 is a perspective view of connection member 45 in a case where flow rate measurer 44 is configured to include two flow rate measurement units 17. FIG. 8 is a perspective view illustrating a connection state of connection member 45 and two flow rate measurement units 17.

As illustrated in FIG. 7, connection member 45 is configured to have a larger diameter than that of connection member 15 (refer to FIG. 3) connected to one flow rate measurement unit 17. Connector 45a has a size which can be fitted to two flow rate measurement units 17. In flow rate measurer 44, lower surfaces of measurement flow paths 20 of two flow rate measurement units 17 are combined with each other, and through-holes and projections which are disposed in engagement portions 25a to 25d are combined with each other so that two flow rate measurement units 17 are fastened to each other.

Then, flow rate measurer 44 can measure the flow rate twice as much as the flow rate that can be measured by flow rate measurer 14 using only one flow rate measurement unit 17.

Whereas arithmetic unit 21 is located above in flow rate measurement unit 17 in FIG. 1, arithmetic unit 21 is located in a lateral direction in flow rate measurement unit 17 in FIG. 8. However, as a matter of course, an attachment direction of flow rate measurement unit 17 may be appropriately determined.

As described above, the gas meter according to the present invention includes the meter body that has the internal space, the meter inlet into which the fluid flows, the meter outlet from which the fluid flows out, and the shielding plate that is located with the predetermined distance from the opening portion of the meter inlet. In addition, the gas meter includes the flow rate measurer that measures the flow rate of the fluid, and the connection member that connects the outlet of the flow rate measurer and the meter outlet to each other. Furthermore, the meter inlet, the shielding plate, the flow rate measurer, the connection member, and the meter outlet are linearly located in this order.

According to this configuration, the fluid flowing from the meter inlet is spread to the internal space of the meter body by the shielding plate. Thereafter, the fluid flows into the measurement flow path. Accordingly, the flow velocity of the fluid is stably distributed, thereby enabling accurate measurement.

In addition, the gas meter according to the present invention may be configured to include the plurality of independent flow rate measurement units, and the connection member may be configured so that the outlets of the plurality of flow rate measurement units are connected to the meter outlet, as one flow path.

In this way, a high flow rate can be measured using the plurality of identical flow rate measurement units, and cheaper cost can be realized, compared to a case where the flow rate measurement units corresponding to the flow rate are individually prepared.

In addition, the gas meter according to the present invention may be configured so that at least the outlets of the plurality of flow rate measurement units are located in contact with each other.

According to this configuration, sealing between the plurality of outlets can be easily performed, and the gas can be prevented from flowing from a portion other than the measurement flow path in the connector with the connection member.

In addition, as a single flow path, the gas meter according to the present invention may be configured to have a cross-sectional area through which the fluid is allowed to pass as much as at least 10 cubic meters or more per hour.

In addition, the gas meter according to the present invention may be configured as follows. In the flow rate measurer, the cross-sectional area of the flow path through which the fluid flows is set to be smaller than the cross-sectional area of the flow path of the meter outlet, and the cross-sectional area of the flow path of the connection member is expanded along the flow path direction in the connection member.

According to this configuration, it is possible to use a miniaturized flow rate measurement unit which can measure a high flow rate, and thus, it is possible to achieve a compact size of the gas meter.

In addition, in the gas meter according to the present invention, the cross-sectional area of the flow path through which the fluid flows in the flow rate measurer may be set to be smaller than the cross-sectional area of the flow path of the meter inlet.

According to this configuration, the fluid flowing from the meter inlet is once released to an internal section, and the pressure is released. Thereafter, the fluid flows into the measurement flow path, thereby achieving a flow straightening effect resulting from pressure loss.

In addition, the gas meter according to the present invention may be configured so that the flow rate measurer measures the flow rate of the fluid by using the ultrasonic waves.

In addition, the gas meter according to the present invention may adopt a configuration in which the shielding plate is located so that the fluid flowing from the meter inlet spreads in all directions in the internal space.

INDUSTRIAL APPLICABILITY

The gas meter according to the present invention has a single flow path as the measurement unit, and calculates the flow rate of the fluid flowing through the flow path. A large flow path is easily obtained. Accordingly, the present invention is applicable to a wide range of applications requiring high flow rate measurement such as the gas meter for business purposes. In addition, the gas meter according to the present invention is easily applicable to higher flow rate measurement by using the plurality of measurement units configured in this way.

REFERENCE MARKS IN THE DRAWINGS 1, 11, 41 GAS METER
2, 12, 42 METER INLET
3, 14, 44 FLOW RATE MEASURER
4, 16, 46 METER OUTLET
5, 15, 45 CONNECTION MEMBER
11a, 41a METER BODY
13, 43 SHIELDING PLATE
17 FLOW RATE MEASUREMENT UNIT
19, 49 INTERNAL SPACE

The invention claimed is:

1. A gas meter comprising:
a meter body that has an internal space;
a meter inlet into which a fluid flows;
a meter outlet from which the fluid flows out;
a shielding plate that is located with a predetermined distance from an opening portion of the meter inlet;
a flow rate measurer that measures a flow rate of the fluid; and
a connection member that connects an outlet of the flow rate measurer and the meter outlet to each other,
wherein the meter inlet, the shielding plate, the flow rate measurer, the connection member, and the meter outlet are linearly located in this order.

2. The gas meter of claim 1,
wherein the flow rate measurer is configured to include a plurality of flow rate measurement units, and
wherein the connection member connects each outlet of the plurality of flow rate measurement units to the meter outlet so that the outlets of the plurality of flow rate measurement units are one flow path.

3. The gas meter of claim 2,
wherein the plurality of flow rate measurement units are located so that at least the outlets are in contact with each other.

4. The gas meter of claim 2,
wherein a single flow path of the flow rate measurement unit has a cross-sectional area through which the fluid is allowed to pass as much as at least 10 cubic meters or more per hour.

5. The gas meter of claim 1,
wherein a flow path cross-sectional area through which the fluid flows in the flow rate measurer is smaller than a flow path cross-sectional area of the meter outlet, and
wherein a flow path cross-sectional area of the connection member expands along a flow path direction in the connection member.

6. The gas meter of claim 1,
wherein a flow path cross-sectional area through which the fluid flows in the flow rate measurer is smaller than a flow path cross-sectional area of the meter inlet.

7. The gas meter of claim 1,
wherein the flow rate measurer measures the flow rate of the fluid by using ultrasonic waves.

8. The gas meter of claim 1,
wherein the shielding plate is located so that the fluid flowing from the meter inlet spreads in all directions in the internal space.

* * * * *